(12) United States Patent
Laackmann

(10) Patent No.: US 7,481,178 B2
(45) Date of Patent: Jan. 27, 2009

(54) RADIO-INTERROGABLE DATA STORAGE MEDIUM

(75) Inventor: Peter Laackmann, Munich (DE)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 11/157,495

(22) Filed: Jun. 20, 2005

(65) Prior Publication Data

US 2005/0284358 A1 Dec. 29, 2005

(30) Foreign Application Priority Data

Jun. 23, 2004 (DE) .................. 10 2004 030 229

(51) Int. Cl.
*G08B 13/14* (2006.01)

(52) U.S. Cl. .............. 116/216; 116/307; 340/572.3

(58) Field of Classification Search ............. 116/307, 116/1, 200, 206, 207, 216, 217, DIG. 1; 340/571, 572.1–572.9, 371, 372.1–372.9

See application file for complete search history.

(56) References Cited

U.S. PATENT DOCUMENTS

| | | | |
|---|---|---|---|
| 2,932,971 A * | 4/1960 | Field, Jr. et al. | 374/104 |
| 3,256,518 A * | 6/1966 | Crane | 116/216 |
| 3,396,335 A * | 8/1968 | Burr et al. | 324/537 |
| 3,609,741 A * | 9/1971 | Miller | 340/572.3 |
| 3,624,631 A * | 11/1971 | Chomet et al. | 340/572.3 |
| 3,938,044 A * | 2/1976 | Lichtblau | 340/572.3 |
| 4,063,229 A * | 12/1977 | Welsh et al. | 340/571 |
| 4,588,949 A * | 5/1986 | Becker et al. | 116/307 |
| 4,838,664 A * | 6/1989 | Graham | 349/199 |
| 4,891,250 A * | 1/1990 | Weibe et al. | 374/162 |
| 5,027,106 A * | 6/1991 | Lizzi et al. | 340/572.3 |
| 5,254,974 A * | 10/1993 | Rebers et al. | 340/572.3 |
| 5,517,195 A * | 5/1996 | Narlow et al. | 340/572.3 |
| 5,673,028 A * | 9/1997 | Levy | 116/216 |
| 5,942,987 A * | 8/1999 | Heinrich et al. | 340/572.3 |
| 6,281,795 B1 * | 8/2001 | Smith et al. | 340/572.3 |
| 6,752,837 B2 * | 6/2004 | Karp | 340/572.1 |
| 6,995,652 B2 * | 2/2006 | Carrender et al. | 340/5.61 |
| 7,004,621 B2 * | 2/2006 | Roberts et al. | 374/106 |
| 7,209,042 B2 * | 4/2007 | Martin et al. | 340/572.8 |
| 7,233,250 B2 * | 6/2007 | Forster | 340/572.8 |
| 7,321,307 B1 * | 1/2008 | Tow et al. | 340/572.3 |
| 7,327,261 B2 * | 2/2008 | Weslake et al. | 340/572.1 |
| 2001/0013830 A1 * | 8/2001 | Garber et al. | 340/572.3 |
| 2004/0012496 A1 * | 1/2004 | De Souza et al. | 340/572.3 |
| 2006/0087436 A1 * | 4/2006 | Reddy et al. | 340/572.3 |
| 2006/0132313 A1 * | 6/2006 | Moskowitz | 340/572.3 |
| 2008/0150721 A1 * | 6/2008 | Weslake et al. | 340/572.3 |
| 2008/0187021 A1 * | 8/2008 | Haarer et al. | 374/102 |

FOREIGN PATENT DOCUMENTS

DE 42 12 111 A1 10/1993
DE 298 05 635 U1 8/1999

(Continued)

*Primary Examiner*—R. A. Smith
(74) *Attorney, Agent, or Firm*—Dickstein, Shapiro, LLP.

(57) ABSTRACT

A radio-interrogable data storage medium having a carrier in which electric components are embedded, and a component for optically signaling a previously assumed operating state. Also, a method for operating the radio-interrogable data storage medium, including the steps of the data storage medium assuming various operating states, and optically signaling at least one previously assumed operating state.

17 Claims, 1 Drawing Sheet

FOREIGN PATENT DOCUMENTS

| | | |
|---|---|---|
| DE | 102 18 057 A1 | 11/2003 |
| DE | 103 19 112 A1 | 11/2004 |
| DE | 103 45 595 A1 | 2/2005 |
| EP | 276919 A1 * | 8/1988 |
| GB | 2100860 A * | 1/1983 |
| JP | 2002117689 A * | 4/2002 |

* cited by examiner

RADIO-INTERROGABLE DATA STORAGE MEDIUM

CROSS-REFERENCE TO RELATED APPLICATION

This application claims priority to German Patent Application Serial No. 10 2004 030 229.4, filed Jun. 23, 2004, and which is incorporated herein by reference in its entirety.

FIELD OF THE INVENTION

The invention relates to a radio-interposable data storage medium having a display and a method for operating the same.

BACKGROUND OF THE INVENTION

Radio-interposable data storage media, also known as RFID tags (radio frequency identification tags), are becoming more and more widespread because semiconductor components are becoming cheaper and cheaper. In their simplest form, they are used for security against theft (electronic article surveillance, EAS) as a 1-bit transponder in department stores. They comprise a sticker or label, to which a tuned electric circuit connected to an antenna is fixed. The resonant frequency of the tuned circuit, comprising coil and capacitor, is matched to the frequency of a detection device. As the detection antennas at the exit from the shop are passed, energy is extracted from the electromagnetic field existing between the detection antennas and an alarm is triggered. On the other hand, if the goods have been paid for, by means of an intense magnetic field at the cash desk such a high voltage is induced in the transponder that its capacitor is damaged and therefore the tuned circuit is detuned. When the detection antennas are passed, energy is no longer extracted from the electromagnetic field and, accordingly, no alarm is triggered.

Modern RFID tags are substantially based on the same functional principle but contain in addition semiconductor memories, in which, for example, an identification number is stored. These RFID tags can be read by a reader without contact via radio. Further developments make it possible not only to read data but also to write the RFID tags with data. If RFID tags are equipped with processors which, for example, have cryptographic functions, authentication methods and encryption are even possible.

RFID tags have numerous advantages: they can be read not only without contact but also without a direct line of sight between reader and RFID tag. This is an advantage in particular as compared with the widespread bar code, since RFID tags can still be read even if they are hidden, such as for example under a layer of paint or dirt, in a delivery of a plurality of parts or a package. Furthermore, RFID tags are autonomous, that is to say they can be operated over a period of many years without a battery. They extract the energy needed for operation from the electromagnetic field of the readers. A further advantage of RFID tags is that substantially more data can be stored in them than, for example, in bar codes.

The advantages of RFID tags lead to diverse and innovative possible applications. If articles are identified with RFID tags, then, for example, automatic monitoring of sales racks is possible. As soon as the last unit has been sold, the store personnel are requested to fill the rack again. If fitted in items of clothing, RFID tags can provide an intelligent washing machine with tips about the type of cleaning to be selected. A shopping cart which is filled with articles identified with RFID tags could simply be pushed past a reader at the cash desk, the prices being registered by radio. However, the use of RFID tags in logistics is of particular economic importance. With the aid of an electronic product code (EPC), which allocates a unique number worldwide to each article, RFID tags make efficient and automated product processing possible in delivery chains which cover the world. For example, all the individual parts of a pallet load could be inspected without any visual connection, given appropriate marking with RFID tags. However, a precondition for this is that, even in the case of identical articles, each article is given an individual number. If the possibility of writing RFID tags is also provided, then in addition to the point of origin, transport routes and storage conditions can additionally be traced back and, in this way, the entire chain comprising manufacturer, seller and final purchaser can be monitored. The possible savings in work and time as a result of using RFID tags are enormous.

However, pilot trials with RFID tags in large retail concerns have met with resistance from civil liberty and data protection activists. Amongst other things, there is a fear that the RFID tags will be read unnoticed and without the knowledge of the consumer. This is important in particular if an article which is identified uniquely worldwide is linked with personal data, such as that which is transmitted when payment is made with a credit card. If this link is followed, then, for example, a movement profile could be drawn up and, by using RFID tags on other articles, a purchasing behavior could be determined. Shoes which are provided with RFID tags could be read at every entry provided with a reader. Clothing which contains RFID tags can be read not only by the washing machine but also by a reader fitted by an employer at the place of work and used to monitor the employees. The consumer would thus become a transparent consumer and able to be monitored. The offer to destroy the RFID tags at the cash desk and thus to prevent misuse is mistrusted, since the consumer has no possibility of distinguishing between permanently deactivated and temporarily silenced (sleep mode) tags.

SUMMARY OF THE INVENTION

The invention is therefore based on an object of specifying a radio-interposable data storage medium and a method for operating such a radio-interposable data storage medium in which permanent deactivation can readily be seen by the consumer.

According to the invention, the object is achieved in that the data storage medium has a component for indicating a previously assumed operating state. If this previously assumed operating state is a state in which the data storage medium is led by an intense electromagnetic field to an excessively high power consumption, which leads to an increase in the temperature and to the destruction of electric components of the data storage medium, then this can be striven for specifically, in order to cause the radio-interposable data storage medium to become functionally unserviceable. The component for indicating a previously assumed operating state, in which it is assumed that one or more electric components lose their serviceability, therefore constitutes an indication of the deactivation of the data storage medium, by using which a consumer can easily detect the permanent deactivation of the data storage medium.

BRIEF DESCRIPTION OF THE DRAWING

The invention will be explained in more detail below using an exemplary embodiment and with the aid of the FIGURE.

DETAILED DESCRIPTION OF PREFERRED EMBODIMENTS OF THE INVENTION

Figure 1:
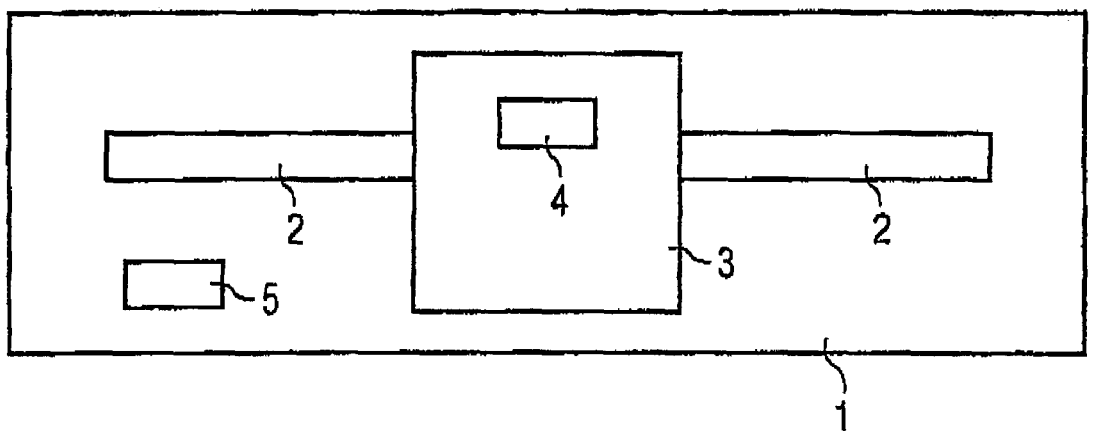

The data storage medium has a component for indicating a previously assumed operating state. If this previously assumed operating state is a state in which the data storage medium is led by an intense electromagnetic field to an excessively high power consumption, which leads to an increase in the temperature and to the destruction of electric components of the data storage medium, then this can be striven for specifically, in order to cause the radio-interposable data storage medium to become functionally unserviceable. The component for indicating a previously assumed operating state, in which it is assumed that one or more electric components lose their serviceability, therefore constitutes an indication of the deactivation of the data storage medium, by using which a consumer can easily detect the permanent deactivation of the data storage medium.

The component for indicating a previously assumed operating state is a thermo chromic substance. This has the advantage that the indication functions even when the radio-interposable data storage medium is deactivated, since it has no electric components and thus needs no power.

The color change of the thermochromic substance is irreversible. This means that a previously assumed operating state is indicated permanently.

The color change of the thermochromic substance preferably takes place at temperatures above 130 degrees Celsius. As a result of this relatively high temperature, a color change of the thermochromic substance caused by other temperature-increasing influences, such as thermal radiation, is for the most part ruled out.

The radio-interposable data storage medium advantageously has further thermochromic substances which are not located in the region of the electric components of the data storage medium. In this way, an increase in the temperature of the entire data storage medium can be distinguished from an increase in the temperature of only the electric components of the data storage medium.

The previously assumed operating state is advantageously indicated optically. This is particularly advantageous, since the assumption of a previous operating state is possible without further aids. It is "obvious" that the operating state has been assumed at least once.

In order to reach the operating state, the radio-interposable data storage medium is advantageously exposed to an intense electromagnetic field. The electric components of the data storage medium pick up excessive electric power as a result.

The power picked up from the electromagnetic field is advantageously converted into heat and leads to an increase in temperature in the region of the electric components of the data storage medium.

The increase in temperature in the region of the electric components of the data storage medium is advantageously made visible by means of a color change. As a result, it is readily possible to detect that this region and the electric components of the data storage medium contained therein have at least once exceeded a predefined temperature.

The color change is advantageously implemented by using thermochromic substances. In this way, no additional electric components are required in order to indicate the previously assumed operating state, so that, even without a source of energy, it is possible to indicate that the data storage medium has assumed a previously assumed operating state. In this way, it is readily clear to a consumer that the RFID tag belonging to the article obtained by him has actually been deactivated.

The color change of the thermochromic substance is advantageously irreversible. This avoids the situation where the indication of the previously assumed operating state dies out after the electric components have cooled down.

Still further thermochromic substances are advantageously applied to the data storage medium in the region outside the electric components of the data storage medium and, by means of a color change, indicate an increase in the temperature of the entire data storage medium. If both the thermochromic substances in the vicinity of the electric components and the other thermochromic substances on the data storage medium have changed color, then it can be assumed that the electric components have not been heated by an excessive power consumption but that the entire data storage medium has been subjected to a high temperature. The thermochromic substances in the region outside the electric components must again have irreversible color changes and can also change their color at different temperatures, so that it is possible to determine what temperature was reached.

The FIGURE shows a radio-interposable data storage medium having a component for indicating a previously assumed operating state. As an example, an RFID tag is illustrated which comprises a basic body 1, an antenna 2, the electric components 3, a thermochromic substance 4 in the region of the electric components 3 and a further thermochromic substance 5. The antenna 2 is connected electrically to the electric components 3.

The basic body 1 can be a sticker, a label or a card body and serves as a carrier for the other components of the RFID tag.

The antenna 2 is illustrated as a dipole, by way of example, and is used to supply the RFID tag with power and to interchange data with the reader and writer by means of load modulation. Instead of a dipole, any other suitable antenna form can also be used. Likewise, other non-contact coupling mechanisms, such as capacitive or inductive coupling, can also be used for the transmission of power and data. Even an RFID tag which is suitable both for non-contact and for contact transmission is suitable. In such a case, the contact reader must be adapted in order to be able to deactivate the RFID tag.

The electric components 3 contain, for example, a rectifier for rectifying the voltage induced by the antenna 2, an energy store, which can be implemented in the form of a capacitor, a voltage regulator, and a memory for storing the identifying data. Of course, expansions of the electric components 3 by, for example, a processor for encrypting data or programs for processing data further are possible. The electric components 3 can be constructed discretely or as integrated circuits.

If the RFID tag is introduced into an electromagnetic field, then it picks up electromagnetic energy via the antenna 2. If the RFID tag is in a very intense electromagnetic field, more electric energy will be picked up than consumed. The excess energy is converted into heat in the electric components 3 and leads to their thermal overloading. This procedure can be used specifically in order to destroy at least one of the electric components 3 and in this way to deactivate the RFID tag permanently. Ideally, the electromagnetic field used for the deactivation has the same frequency as that used for reading and possibly for writing the RFID tag. If this frequency is unknown, then the frequency of the electromagnetic field can be varied over a wide range, so that, at the resonant frequency, sufficient power is picked up in order to ensure deactivation of the RFID tag by destroying one of the electric components 3.

The thermochromic substance 4 is a chemical preparation which changes its color more or less continuously at specific temperatures. For example, the color changes from red to yellow. It is also possible to use thermochromic substances 4 which exhibit a plurality of color changes at different temperatures. The thermochromic substance 4 can, for example, correspond to those which are known from use in film thermometers or spoons for feeding children which indicate whether the food is too hot by means of a color change. Substances of this type can be applied to the electric components 3, for example, by adhesive bonding.

In order to apply a thermochromic substance 4, temperature measuring crayons can also be used. These can be obtained for temperature measuring ranges between 50 and 800° C. By using them, colored lines are applied to the surface to be examined, for example a cylinder head of an engine, or the electric components 3. The color of such temperature measuring crayons changes a few seconds after the changeover temperature is reached.

Alternatively, powdery temperature measuring colors can also be used, which are scattered onto the electric components 3 and fixed or encapsulated, for example by means of a transparent layer.

A further possibility is the use of thermochromic pigments in paints or inks, which are applied as liquid colors to the appropriate regions of the data storage medium.

As an alternative to the thermochromic substance 4, thermometer papers, which are paper strips provided with a heat-sensitive substance, can be used to indicate the deactivation. The use of thermal paper in printers is widespread. Thermometer papers change color from white to black in fractions of a second when reaching a respectively characteristic temperature. The color change does not reverse upon cooling. The strips can be obtained in graduations of a few degrees for a range from 37 to 254° C. and can be applied to the electric components 3. For the purpose of protection against vapors, greases, solvents and the like, they can be covered with a protective layer or fused into small glass tubes.

Instead of the thermochromic substance 4, other temperature-dependent substances can also be used, such as temperature paints, which initially have a dull appearance but become liquid and smooth at a specific temperature. Following cooling, the fact that the temperature has been exceeded is detected by the glass-like appearance of the surface.

Irrespective of the method with which the increase in temperature is made visible, it is important that the color change is irreversible.

The thermochromic substance 4 is illustrated in the FIGURE as a region which is smaller than the region of the electric components 3. This is not absolutely necessary; the thermochromic substance 4 can be just as large as the electric components 3 or else smaller than these. The area of a dot which can still be detected by the naked eye would be sufficient to indicate the fact that a specific temperature has been reached.

In the FIGURE, all the electric components 3 for operating the RFID tag are combined in one subassembly. However, the thermochromic substance 4 can also be applied to the individual components, such as the rectifier, the voltage regulator, the energy store or the processor. However, it is advantageous if the thermochromic substance is applied specifically at a point which is heated as highly as possible in the intense electromagnetic field, such as is the case in components with a high power consumption, for example. In this case, the thermochromic substance 4 can be applied directly to a housing or at a distance above a thermally conductive material.

In a particular embodiment, the heat is concentrated on the smallest possible region. This is different from the usual practice, where it is wished to avoid local temperature peaks building up and heat is specifically dissipated. As a result of the concentration of heat, it is possible to achieve greater temperature differences than in the case of a wide distribution of the thermal energy. It is possible for weaker electromagnetic fields to be used to deactivate the data storage media. Given a field of the same intensity, data storage media can be deactivated in a shorter time, which is advantageous in particular in the case of a plurality of data storage media to be deactivated. It would be possible to use thermochromic substances 4 which have a higher changeover temperature and, in this way, for erroneous indications to be reduced. Such a concentration of heat could be achieved by specific thermal insulation of components. It is also advantageous if the component on which the temperature increase is measured has the lowest possible thermal capacity. In this way, given the same amount of supplied electric power, a greater difference in temperature from adjacent regions can be achieved.

Also possible is an embodiment in which the housing of an electric component is already provided with thermochromic pigments during production, so that a separate thermochromic substance 4 for indicating a specific temperature reached is no longer necessary.

In the FIGURE, the further thermochromic substance 5 is applied at some distance from the electric components 3. In this case, the actual distance to the electric components 3 does not play a critical role; it is merely important that the region in which the further thermochromic substance 5 is located is not heated as intensely by an intense electromagnetic field during deactivation of the RFID tag as the region to which the thermochromic substance 4 is applied. The further thermochromic substance 5 could therefore also be applied to the electric components 3 at a point which is heated less intensely. It is also possible for more than one, different, further thermochromic substance 5 to be applied to the RFID tag.

The further thermochromic substance 5 could also be omitted completely. In this case, the region covered by the thermochromic substance 4 is made larger than the hottest point on the electric components 3. If the data storage medium were introduced into an intense electromagnetic field, then, for example, if the hottest point were located at the center of the thermochromic substance 4, the center of the thermochromic substance 4 would change from red to yellow, but its color would remain unchanged at the edge.

The further thermochromic substances 5 can change their color at the same temperature as the thermochromic substance 4. It is also conceivable for it to change color at a lower temperature or, in the case of a plurality of thermochromic substances 5, for these to have different changeover temperatures. In this way, it is possible, given irreversible color changes, to determine the maximum temperature to which the data storage medium was exposed.

The thermochromic substance 5 is used for the purpose of detecting an increase in the temperature of the thermochromic substance 4, and therefore of the electric components 3, which cannot be attributed to an intense electromagnetic field. Although, in the event of an increase in the temperature of the entire data storage medium, the electric components 3 would likewise be heated, the electric components 3 would not be destroyed, since no currents flow. The color change of the thermochromic substance 4 must take place at a temperature which lies below the temperature which is needed to destroy the electric components 3. The same possible variations as for the thermochromic substance 4 apply to the implementation of the further thermochromic substance 5.

One application of a radio-interposable data storage medium with deactivation indication would be, for example, in banknotes which are provided with RFID tags as a security feature for unambiguous identification and for tracking circulation. If an attempt is made to deactivate such an RFID tag by means of an intense electromagnetic field, then, by means of the thermochromic substance 4, it would be obvious to all those given this banknote that an attempt had been made to deactivate this security feature.

What is claimed is:

1. A radio frequency identification tag, comprising:
   a carrier in which electric components are embedded, the electronic components comprising:
   a memory for storing identifying data;
   an antenna that is electrically connected to the electrical components; and
   a thermochromic substance adapted to optically signal a previously assumed operating state, wherein the thermochromic substance is fitted in the vicinity of the electric components of the radio frequency identification tag and exhibits a plurality of color changes at different temperatures, and wherein the previously assumed operating state corresponds to an excessive power consumption of the electric components through the antenna, which leads to functional unserviceability of the radio frequency identification tag.

2. The radio frequency identification tag of claim 1, wherein a frequency of an electromagnetic field which causes the excessive power consumption is varied over a wide range.

3. The radio frequency identification tag of claim 1, wherein a frequency of an electromagnetic field which causes the excessive power consumption has the same frequency as is used for reading and writing the radio frequency identification tag.

4. The radio frequency identification tag of claim 1, wherein the color change of the thermochromic substance is irreversible.

5. The radio frequency identification tag of claim 4, wherein the color change of the thermochromic substance takes place at temperatures above 130degrees Celsius.

6. The radio frequency identification tag of claim 1, wherein the thermochromic substance occupies a region which is smaller than the region of the electric components.

7. The radio frequency identification tag of claim 1, wherein heat generated by the electrical components due to the excessive power consumption is concentrated on the thermochromic substance by thermal insulation of the electrical components.

8. The radio frequency identification tag of claim 1, wherein the thermochromic substance is applied to individual electronic components.

9. The radio frequency identification tag of claim 8, wherein the thermochromic substance is made larger than the electric component, so that only a part of the thermochromic substance that is heated by the electric component during the excessive power consumption changes color while the other part of the thermochromic substance does not change its color.

10. The radio frequency identification tag of claim 8, wherein the thermochromic substance is placed on the electrical component with the lowest thermal capacity.

11. The radio frequency identification tag of claim 8, wherein a housing of the electric component is provided with the thermochromic substance.

12. The radio frequency identification tag of claim 1, wherein the thermochromic substances are replaced with a temperature paint, which initially has a dull appearance but becomes liquid and smooth at a specific temperature and after cooling has a glass-like appearance.

13. The radio frequency identification tag of claim 1, wherein capacitive coupling is used instead of the antenna.

14. A radio frequency identification tag, comprising:
    a carrier in which electric components are embedded, the electronic components comprising:
    a memory for storing identifying data;
    an antenna that is electrically connected to the electrical components;
    a thermochromic substance adapted to optically signal a previously assumed operating state, wherein the thermochromic substance is fitted in the vicinity of the electric components of the radio frequency identification tag, and wherein the previously assumed operating state corresponds to an excessive power consumption of the electric components through the antenna, which leads to functional unserviceability of the radio frequency identification tag; and
    an additional region with at least one thermochromic substance which is not located in a region of any electric components and which is not heated during the excessive power consumption as much as the thermochromic substance adapted to optically signal a previously assumed operating state.

15. The radio frequency identification tag of claim 14, wherein the color change of the thermochromic substances in the additional region is irreversible.

16. The radio frequency identification tag of claim 15, wherein the thermochromic substance in the additional region change color at temperatures which are below the temperature leading to functional unserviceability.

17. A method for operating a radio frequency identification tag comprising electronic components and an antenna connected to the electronic components, comprising:
    the radio frequency identification tag assuming various operating states;
    optically signaling at least one previously assumed operating state;
    exposing the antenna of the radio frequency identification tag to an intense electromagnetic field to convert the power picked up from the electromagnetic field into heat in order to reach the operating state to be signaled, thereby resulting in destruction of at least one of the electric components of the radio frequency identification tag;
    making visible the increase in temperature in the region of the electric components of the radio frequency identification tag by means of an irreversible color change in a thermochromic substance; and
    indicating, by means of other thermochromic substances applied to the radio frequency identification tag in the region outside the electric components. an increase in the temperature of the entire radio frequency identification tag by means of a color change, wherein the region in which the other thermochromic substances are located is not heated as intensely by the intense elcctromagnetic field as thc region to which the thermochromic substance for optically signaling the at least one previously assumed operating state is applied.

* * * * *